(12) United States Patent
Kakuta

(10) Patent No.: US 7,072,860 B2
(45) Date of Patent: Jul. 4, 2006

(54) ELECTRONIC SHOPPING MALL

(75) Inventor: Kazumasa Kakuta, Inagi (JP)

(73) Assignee: Fujitsu Limited, Kawasaki (JP)

(*) Notice: Subject to any disclaimer, the term of this patent is extended or adjusted under 35 U.S.C. 154(b) by 228 days.

(21) Appl. No.: 10/465,598

(22) Filed: Jun. 20, 2003

(65) Prior Publication Data

US 2003/0225630 A1    Dec. 4, 2003

Related U.S. Application Data

(63) Continuation of application No. PCT/JP00/09089, filed on Dec. 21, 2000.

(51) Int. Cl.
*G06Q 30/00* (2006.01)

(52) U.S. Cl. .......................... 705/26; 705/14

(58) Field of Classification Search .................. 705/26, 705/14, 27
See application file for complete search history.

(56) References Cited

U.S. PATENT DOCUMENTS

| | | | | |
|---|---|---|---|---|
| 5,710,887 A | * | 1/1998 | Chelliah et al. | 705/26 |
| 5,970,469 A | | 10/1999 | Scroggie et al. | |
| 5,999,914 A | * | 12/1999 | Blinn et al. | 705/26 |
| 6,125,353 A | * | 9/2000 | Yagasaki | 705/27 |
| 2001/0007979 A1 | * | 7/2001 | Teshima | 705/26 |
| 2001/0044751 A1 | * | 11/2001 | Pugliese et al. | 705/26 |
| 2001/0053999 A1 | * | 12/2001 | Feinberg | 705/14 |
| 2004/0243478 A1 | * | 12/2004 | Walker et al. | 705/26 |

FOREIGN PATENT DOCUMENTS

| | | |
|---|---|---|
| EP | 0 950 970 | 10/1999 |
| EP | 1 031 935 A2 | 8/2000 |
| JP | 09-330360 | 12/1997 |
| JP | 10-229555 | 8/1998 |
| JP | 10-254966 | 9/1998 |
| JP | 10-320470 | 12/1998 |
| JP | 11-053587 | 2/1999 |
| JP | 11-259576 | 9/1999 |
| JP | 11-296587 | 10/1999 |
| JP | 2000-113056 | 4/2000 |
| JP | 2000-250980 | 9/2000 |
| JP | 02001357227 A | * 12/2001 |

OTHER PUBLICATIONS

Monica Soto, "Virtual Mall as Job Benefit is Catching on," Seattle Times, Seattle, Washington, Nov. 24, 1999, p. C.2.*

(Continued)

*Primary Examiner*—Jeffrey A. Smith
*Assistant Examiner*—Matthew S Gart
(74) *Attorney, Agent, or Firm*—Staas & Halsey LLP

(57) ABSTRACT

An electronic shopping mall in which customers can enjoy shopping including discount negotiations. The mall includes a shopping mall server that manages the electronic shopping mall, and a shop server that manages a virtual shop in the electronic shopping mall. In response to a discount request provided by the customer, the shopping mall server responds as to the discount to be borne by the electronic shopping mall to the customer. When a request for a further-discount which is beyond the discount to be borne by the electronic shopping mall is provided by the customer, the shopping mall server negotiates with the shop server for a discount to be borne by the virtual shop managed by the shop server.

5 Claims, 21 Drawing Sheets

OTHER PUBLICATIONS

Jun Honma et al., "Web Chumoku Gyoukai, Chumoku Kigyo wa kokoda! Net de nobiru Nihon no "e-kigyo": Jidousha Hanbai kara Knyuu Service made, 15 Gyoukai 200 sha wo shoutenken [Gyoukaihen] Sannyusha aitsugu EC Buisiness Gyoukai chizu ga nurikawaru", Kikkei Net Business, Nikkai BP K.K., Jul. 15, 1999, vol. 45, pp. 50-55.

* cited by examiner (1) TOTAL PURCHASE AMOUNT

| TOTAL PURCHASE AMOUNT (YEN) | ~10,000 | ~20,000 | ~30,000 | 30,000~ | EXPRESSION |
|---|---|---|---|---|---|
| DISCOUNT RATE (%) | 0.5 | 0.7 | 1.0 | 1.2 | DISCOUNT AMOUNT = TOTAL PURCHASE AMOUNT X DISCOUNT RATE |

(2) PURCHASE ITEM

| PURCHASE ITEM (QUANTITY) | ~5 | ~10 | 10~ | — | EXPRESSION |
|---|---|---|---|---|---|
| DISCOUNT RATE (%) | 0.3 | 0.5 | 0.7 | — | DISCOUNT AMOUNT = TOTAL PURCHASE AMOUNT X DISCOUNT RATE |

(3) PURCHASE HISTORY

| PURCHASE HISTORY (FREQUENCY) | FIRST PURCHASE | ~10 | 10~ | — | EXPRESSION |
|---|---|---|---|---|---|
| DISCOUNT RATE (%) | 0 | 0.5 | 0.7 | — | DISCOUNT AMOUNT = TOTAL PURCHASE AMOUNT X DISCOUNT RATE |

(4) CUSTOMER ATTRIBUTE
(AGE/SEX/BIRTHDATE/BACKGROUND/OCCUPATION/ANNUAL INCOME/FAMILY MEMBERS/HOBBY)(SET DISCOUNT CONDITIONS BEFOREHAND ACCORDING TO MALL AND SHOP)

| DOES CUSTOMER ATTRIBUTE MATCH DISCOUNT CONDITIONS? | Yes | No | EXPRESSION |
|---|---|---|---|
| DISCOUNT RATE (%) | 0.1 | 0 | DISCOUNT AMOUNT = TOTAL PURCHASE AMOUNT X (MATCHED NUMBER X 0.1) |

(5) PRODUCT SELLING STATUS FOR EACH SHOP

| SELLING STATUS | GOOD | FAIR | POOR | — | EXPRESSION |
|---|---|---|---|---|---|
| DISCOUNT RATE (%) | 0 | 0.5 | 1.0 | — | DISCOUNT AMOUNT = TARGET PRODUCT PRICE X DISCOUNT RATE |

(6) SPECIAL PRICE PRODUCT

| SPECIAL PRICE PRODUCT? | Yes | No | EXPRESSION |
|---|---|---|---|
| DISCOUNT RATE (%) | SPECIAL PRICE DICOUNT RATE n1 | 0 | DISCOUNT AMOUNT = TARGET PRODUCT PRICE X SPECIAL PRICE DISCOUNT RATE n1 |

(7) SEASONAL/WEATHER CONDITION

| SEASONAL/WEATHER CONDITION | GOOD | FAIR | POOR | — | EXPRESSION |
|---|---|---|---|---|---|
| DISCOUNT RATE (%) | 0 | 1.0 | 3.0 | — | DISCOUNT AMOUNT = SEASONAL PRODUCT PRICE X DISCOUNT RATE |

(8) STOCK STATUS

| STOCK STATUS | SHORT | ORDINARY | PLENTY | — | EXPRESSION |
|---|---|---|---|---|---|
| DISCOUNT RATE (%) | 0 | 0 | 0.5 | — | DISCOUNT AMOUNT = TARGET PRODUCT PRICE X DISCOUNT RATE |

(9) PAYMENT CONDITION

| PAYMENT CONDITION | CREDIT | DEBIT | CASH | EXPRESSION |
|---|---|---|---|---|
| DISCOUNT RATE (%) | 0 | 1.0 | 0.5 | DISCOUNT AMOUNT = TOTAL PURCHASE AMOUNT X DISCOUNT RATE |

(10) BIRTHDAY/LOT

| BIRTHDATE OR PRIZE | Yes | No | EXPRESSION |
|---|---|---|---|
| DISCOUNT RATE (%) | SPECIAL DISCOUNT RATE n2 | 0 | DISCOUNT AMOUNT = TOTAL PURCHASE AMOUNT X SPECIAL DISCOUNT RATE n2 |

(11) EXPECTED NEXT PURCHATE

| EXPECTED PURCHASE (YEN) | ~10,000 | 10,000~ | 30,000~ | EXPRESSION |
|---|---|---|---|---|
| DISCOUNT RATE (%) | 0.1 | 0.2 | 0.3 | DISCOUNT AMOUNT = TOTAL PURCHASE AMOUNT X DISCOUNT RATE |

Fig. 3

Fig. 4 (CONT. ON SECOND SHEET)

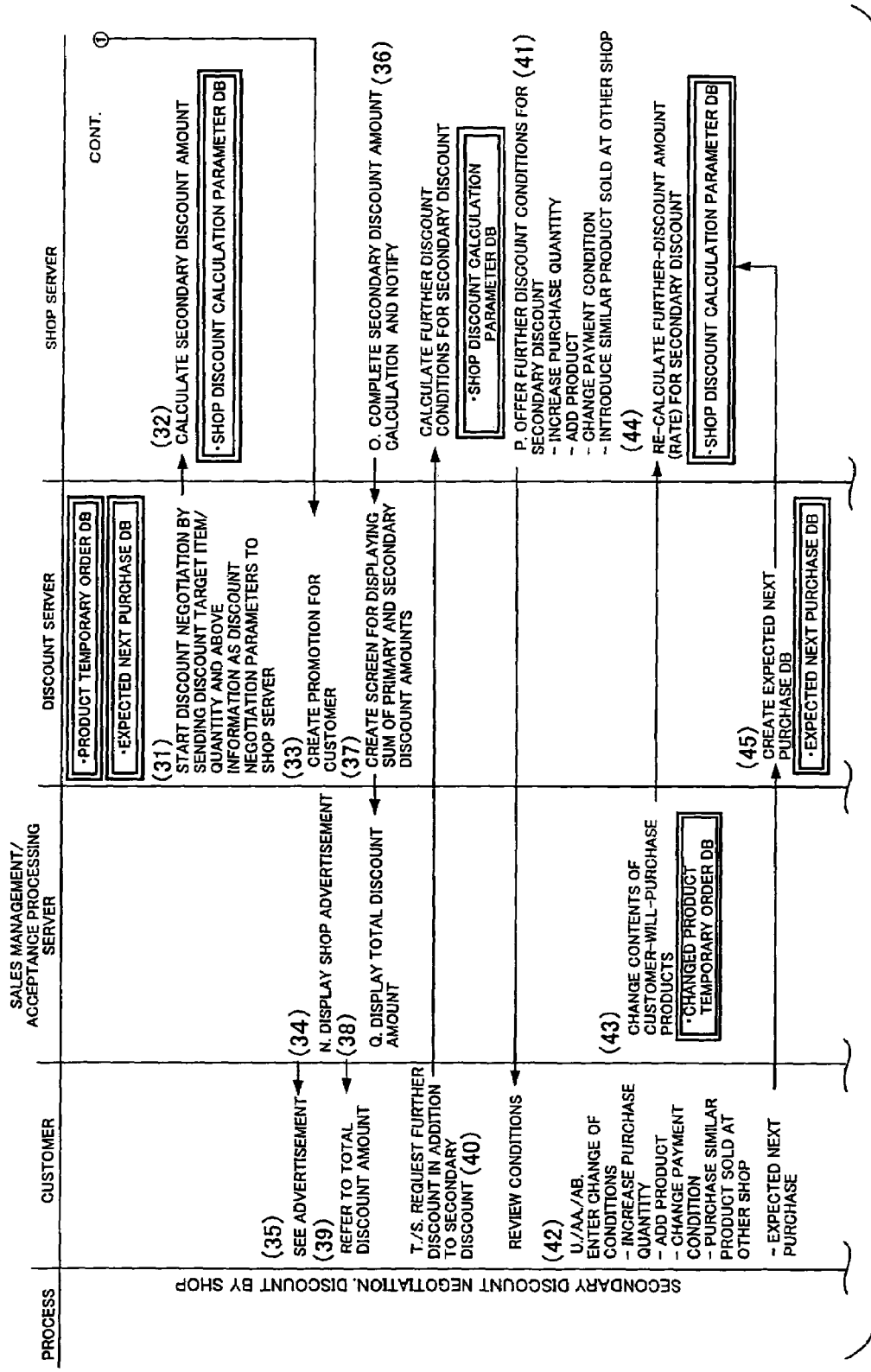
Fig. 5 (CONT. ON SECOND SHEET)

A. ORDER SCREEN

> EVERGREEN SHOPPING MALL
> ITEMS YOU WILL PURCHASE
>     MELON LOTION     2   @1,000     ¥ 2,000
>     PEACH CREAM     1   @2,000     ¥ 2,000
>     CHERRY LIPSTICK   3   @ 700      ¥ 2,100
>                                              TOTAL ¥ 6,100
>
> PAYMENT METHOD     ■ CREDIT CARD
>                                □ DEBIT CARD
>                                □ CASH ON DELIVERY
>
>  Would you like to negotiate with the Shopping Mall for discount?
> If this is your first purchase, you need to register. Will you register?
>
>     YES                   NO
>
> Please enter your number if you have already registered.
> Your Registration NO.   x x x x x x x

Fig. 9

D. SHOPPING MALL ADVERTISEMENT DISPLAY DURING
NEGOTIATION WITH DISCOUNT SERVER

EVERGREEN SHOPPING MALL INFORAMTION

To Ms. Hanako Fujitsu

RECOMMENDATION
OF THIS WEEK

WATERMELON LOTION   ¥1, 980   DETAIL

BARGAIN INFORMATION
OF THIS WEEK

STRAWBERRY CREAM   ¥980   DETAIL
(BLINKING)

Now negotiating with
Shopping Mall for discount...

Fig. 10

E. PRIMARY DISCOUNT AMOUNT OFFERED
BY SHOPPING MALL

| EVERGREEN SHOPPING MALL ITEMS YOU WILL PURCHASE | | | | DISCOUNT AMOUNT |
|---|---|---|---|---|
| H. MELON LOTION | 2 | @1,000 | ¥2,000 | -¥100 |
| H. PEACH CREAM | 1 | @2,000 | ¥2,000 | ¥0 |
| H. CHERRY LIPSTICK | 3 | @700 | ¥2,100 | -¥600 |
| | | TOTAL | ¥6,100 | -¥700 |

TOTAL AFTER DISCOUNT  ¥5,400
If you purchase, click   F. YES.
If you are not satisfied with the discount, click G. NO.
If you prefer further discount, click item names you want.
We will start discount negotiation with shops.

Fig. 11

L. EXAMPLE OF DISPLAY FOR PRIMARY DISCOUNT
AMOUNT AFTER FURTHER DISCOUNT

```
EVERGREEN SHOPPING MALL
You added [1 piece] of Melon Lotion ¥1,000.
*** CURRENT AVAILABLE DISCOUNT STATUS ***

ITEMS YOU WILL                              DISCOUNT
  PURCHASE                                   AMOUNT
H. MELON LOTION      3 @1,000   ¥3,000      -¥200
H. PEACH CREAM       1 @2,000   ¥2,000       ¥  0
H. CHERRY LIPSTICK   3 @  700   ¥2,100      -¥600
                          TOTAL ¥7,100      -¥800

Total purchase amount after discount is now L. ¥6,300.
```

Fig. 12

N. SHOP ADVERTISEMENT DISPLAY DURING
DISCOUNT NEGOTIATION WITH EACH SHOP

MAPLE SHOP
Welcome to Maple Shop!
RECOMMENDATION OF THIS WEEK
  MAPLE SYRUP MADE IN OREGON    DETAIL BARGAIN INFORMATION OF THIS WEEK
  HOOT RIVER AMERICAN CHERRY    DETAIL
(BLINKING)

> Now negotiating with Maple Shop for
> discount on Melon Lotion...

Fig. 13

O. DISPLAY FOR SECONDARY DISCOUNT AMOUNT OFFERED BY EACH SHOP, P. FURHTER DISCOUNT CONDITIONS FOR SECONDARY DISCOUNT NEGOTIATION, AND Q. TOTAL DISCOUNT AMOUNT

EVERGREEN SHOPPING MALL

O. We are sorry to answer that further discount on Melon Lotion is not available.

P. However, if you add ¥2,000 more purchase, Shop can offer ¥100 discount and Mall can offer ¥200 discount, that is, ¥300 discount in total. Will you accept this offer?

T. ADDITIONAL PURCHASE
   (go to ADDITIONAL PURCHASE SCREEN)

Cherry Shop is selling a similar product at slightly lower price. Would you like to see it?
                      S. SIMILAR PRODUCT

* CURRENT AVAILABLE DISCOUNT STATUS *

| ITEMS YOU WILL PURCHASE | | | SHOP DISCOUNT AMOUNT | MALL DISCOUNT AMOUNT |
|---|---|---|---|---|
| • MELON LOTION | 3 @1,000 | ¥3,000 | ¥ 0 | -¥ 200 |
| • PEACH CREAM | 1 @2,000 | ¥2,000 | ¥ 0 | ¥ 0 |
| • CHERRY LIPSTICK | 3 @ 700 | ¥2,100 | ¥ 0 | -¥ 600 |
| | TOTAL | ¥7,100 | ¥ 0 | -¥ 800 |

Total purchase amount after discount is now Q. ¥6,300.
If you purchase, click R. PURCHASE.

Fig. 14

V. DISPLAY FOR TOTAL DISCOUNT AMOUNT
   AFTER NEGOTIATION

```
EVERGREEN SHOPPING MALL
  You added [1 piece] of Peach Cream ¥2,000.

*** CURRENT AVAILABLE DISCOUNT STATUS ***
                                  SHOP      MALL
                               DISCOUNT  DISCOUNT
ITEMS YOU WILL PURCHASE         AMOUNT    AMOUNT
· MELON LOTION    3 @1,000  ¥3,000   ¥   0   -¥200
· PEACH CREAM     2 @2,000  ¥4,000  -¥200   -¥100
· CHERRY LIPSTICK 3 @  700  ¥2,100   ¥   0   -¥600
                    TOTAL   ¥9,100  -¥200   -¥900

Total purchase amount after discount is now W. ¥8,000.

X. PURCHASE
```

Fig. 15

Y. SELLING OF SIMILAR PRODUCT

CHERRY SHOP

LUFFA LOTION     ¥ 800         PC(S).

Would you like to cancel Melon Lotion
and purchase this product?

AA. YES   Z. NO

Fig. 16

AB. DISPLAY FOR COUNTEROFFER BY CUSTOMER

To EVERGREEN SHOPPING MALL,
Will you further discount based on the following counteroffer?

WATERMELON LOTION   1 PC(S). WANT TO ADD   GO

Change the payment method from Credit card to Debit card.

Please enter date and quantity for your next purchase if you are planning.

1 piece of Maple Cosmetic Set around July

Fig. 17

AC. EXAMPLE OF SCREEN FOR DISPLAYING TOTAL
DISCOUNT AMOUNT AFTER NEGOTIATION

```
EVERGREEN SHOPPING MALL
  You added [1 piece] of Melon Lotion ¥1,000.
  You changed the payment method to Debit Card.

*** CURRENT AVAILABLE DISCOUNT STATUS ***
                                    SHOP       MALL
                                    DISCOUNT   DISCOUNT
ITEMS YOU WILL PURCHASE             AMOUNT     AMOUNT
·MELON LOTION          3 @1,000  ¥3,000 -¥ 50   -¥ 200
·PEACH CREAM           1 @2,000  ¥4,000 -¥250   -¥ 100
·CHERRY LIPSTICK       3 @  700  ¥2,100 -¥ 50   -¥ 600
·WATAERMELON LOTION    1 @1,000  ¥1,000 -¥150   -¥ 100
                       TOTAL    ¥10,100 -¥500   -¥1000

Total purchase amount after discount is now W. ¥8,600.
                                          AE. PURCHASE
```

Fig. 18

ELECTRONIC SHOPPING MALL

This is a continuation under 35 U.S.C. § 111(a) of, and claims benefit under 35 U.S.C. § 120 of, PCT/JP00/09089, filed Dec. 21, 2000.

BACKGROUND OF THE INVENTION

1. Technical Field

The present invention relates to an electronic shopping mall configured on a communication network having virtual shops as tenants, which offers and sells products or services to customers in response to the accesses from the customers via the communication network.

2. Background Art

In recent years, services for selling products or services etc. over a communication network called the Internet have been thriving. In such an Internet sales system for selling/buying products or services over a communication network, most of transactions are usually based on prices set by sellers. In such system, generally, a customer surfs plural shopping sites him/herself or using a search system and then selects a shopping site offering the lowest price or the best sales condition out of the shopping sites providing products or services that the customer wants to purchase.

This corresponds to usual shopping off a communication network, in which a customer visits various shops to purchase a product or a service at a store that provides the lowest price or an acceptable sales condition.

The customer may negotiate for a discount if he/she is not satisfied with the price in the usual shopping. However, even if such a discount system is introduced into the sale over the Internet, shops differ widely in handling negotiations for discounts, and thus an appropriate system cannot be configured at present.

Also, there are reverse auction systems whereby a customer sets a desired price beforehand and looks for a seller. However, it is difficult for the customer to participate in this system if he/she does not have enough information on the desired products, the market prices, etc.

SUMMARY OF THE INVENTION

In view of the foregoing, it is an object of the present invention to provide an electronic shopping mall having one or more (typically plural) virtual shops in which customers enjoy shopping including discount negotiations.

To achieve the above-mentioned object, the present invention provides an electronic shopping mall that includes one or more virtual shops and is provided on a communication network to offer and sell products or services to a customer in response to an access provided by the customer via the communication network, having:

a shopping mall server that manages the electronic shopping mall and a shop server that manages the virtual shops in the electronic shopping mall; and wherein the shopping mall server has:

primary offering means for, in response to a request provided by the customer, offering a product or a service that the customer desires to purchase after being selected by the customer from the products or the services handled by the virtual shops in the electronic shopping mall together with a price of the product or the service that the customer desires to purchase;

primary-discount means for, in response to a discount request provided by the customer, providing a reply on a discount to be borne by the electronic shopping mall to the customer; and secondary-discount negotiation means for, in response to a further-discount over the discount to be borne by the electronic shopping mall requested by the customer, carrying out a negotiation with a shop server for a discount to be borne by a virtual shop managed by the shop server, and providing a result of the negotiation to the customer, wherein the shop server has secondary-discount means for, in response to a discount request provided by the shopping mall server, providing a reply on the discount to be borne by the virtual shop managed by the shop server to the shopping mall server.

In the electronic shopping mall of the present invention, the shopping mall server that manages the electronic shopping mall has the primary-discount means, whereby the electronic shopping mall can plan discount tactics in view of the sales and profits of the entire electronic shopping mall. Also, the customer who purchases plural products or services handled by the plural shops (plural virtual shops) can enjoy an advantage of expecting some discounts without negotiating with each shop.

Further, in the electronic shopping mall of the present invention, the shopping mall server has the secondary-discount negotiation means, and the shop server has the secondary-discount means, whereby the customer who is not satisfied with the primary discount can request a secondary-discount negotiation to the shopping mall server so that he/she can expect further discounts without the inconvenience of a direct negotiation with each shop. Also, each shop can offer discounts in view of its sales tactics.

Here, in the electronic shopping mall of the present invention, it is preferable that the shopping mall server further has customer information database configuration means for providing the customer with a questionnaire about personal information of the customer and configuring a customer information database by registering the personal information of the customer based on a result of the questionnaire, and further, the primary-discount means creates an answer on the discount at least referring to the customer information database, to the discount request provided by the customer.

For the calculation of the discount, it is possible to register various information such as selling status of the products and services (ratings), mid/long-term weather forecast, product stock status and respond to the discount request provided by the customer. In a system using a communication network, it is relatively easy to obtain personal information in the form of questionnaire and to share the obtained personal information by the entire electronic shopping mall. By obtaining the personal information in the form of questionnaire and using it when responding to the discount request, the electronic shopping mall can plan further sales tactics.

Further, in the electronic shopping mall of the present invention, it is preferable that the shopping mall server further has primary advertisement means for, while the shopping mall server is creating the reply on the discount in response to the discount request provided by the customer, providing an advertisement of the electronic shopping mall managed by the shopping mall server to the customer.

In addition, it is preferable that the shopping mall server further has secondary advertisement means for, while the shopping mall server is negotiating with the shop server for the discount, providing an advertisement of the virtual shop managed by the shop server to the customer.

With this structure, it is possible to advertise the electronic shopping mall using the customer's waiting time and expand the sale.

Furthermore, in the electronic shopping mall of the present invention, it is preferable that the shopping mall server further has direct negotiation offering means for mediating a direct negotiation between the customer and the shop sever.

By offering the direct negotiation to the customer who is not satisfied with the result of the secondary discount negotiation, it is possible to achieve the sale agreed with the customer. As means of carrying out the direct negotiation, Internet telephone or e-mail for example can be used.

BRIEF DESCRIPTION OF THE DRAWINGS

FIG. 9 is a diagram showing an order screen.

FIG. 10 is a diagram showing a shopping mall advertisement display screen.

FIG. 11 is a diagram showing a screen for presenting a primary discount amount from the shopping mall.

FIG. 12 is a diagram showing a screen for presenting the primary discount amount after a further discount is obtained.

FIG. 13 is a diagram showing a shop advertisement display screen.

FIG. 14 is a diagram showing a secondary discount result display screen.

FIG. 15 is a diagram showing a screen for displaying the total discount amount after negotiation.

FIG. 16 is a diagram showing a screen for selling a similar product.

FIG. 17 is a diagram showing a screen for displaying a counteroffer made by a customer.

FIG. 18 is a diagram showing a screen for displaying the total discount amount after negotiation as an example.

DESCRIPTION OF THE EMBODIMENTS

Embodiments of the present invention will be described hereinafter.

Figure 1:
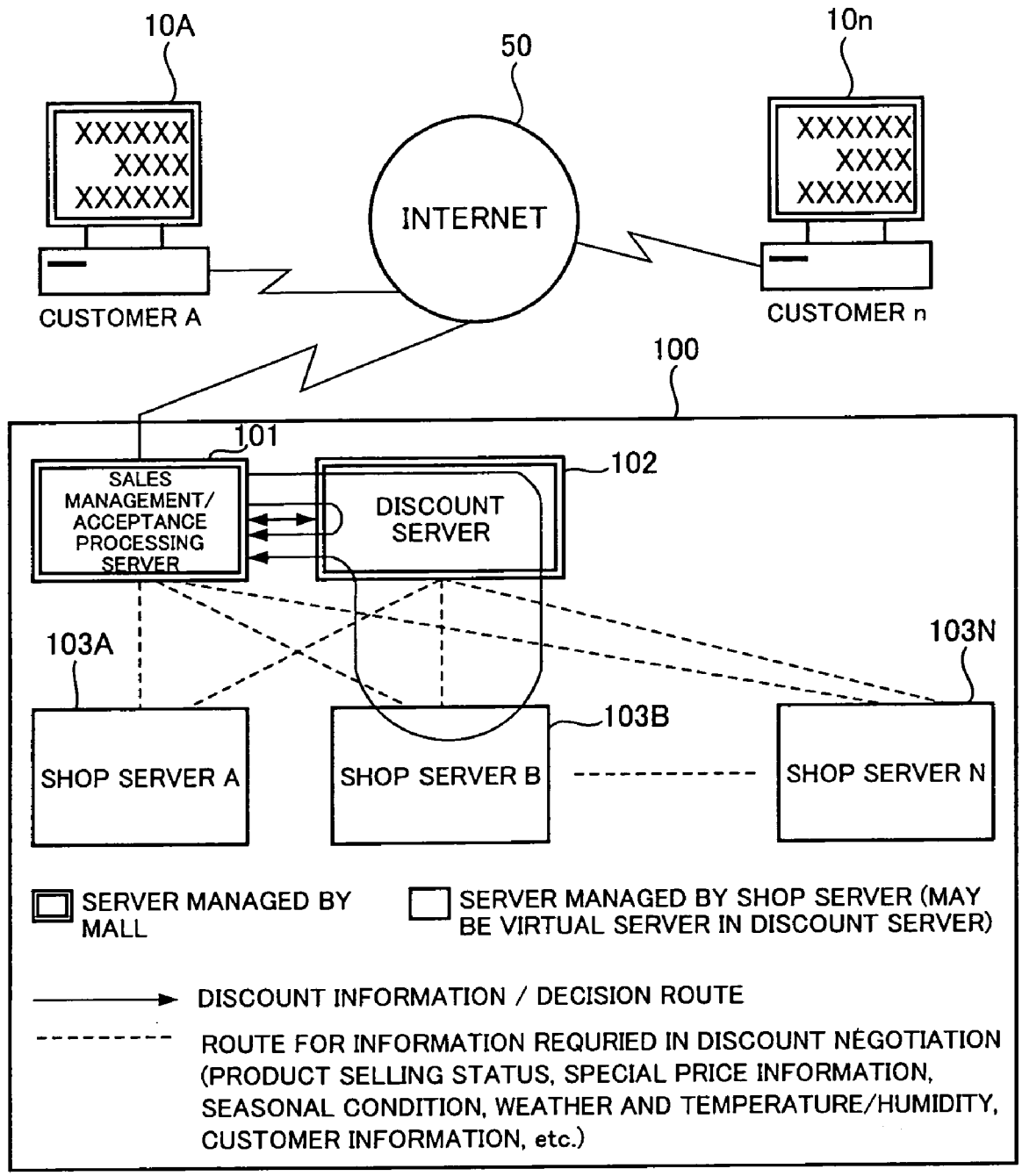
FIG. 1 is a diagram showing an electronic shopping mall as an embodiment of the present invention.

FIG. 1 is a diagram showing an electronic shopping mall as an embodiment of the present invention.

An electronic shopping mall 100 shown in FIG. 1 is configured on the Internet and accessed by customers 10A to 10n (10A to 10n are computers operated by the customers, but shortened to be simply referred to as the customers 10A to 10n) over the Internet 50.

The electronic shopping mall 100 is composed of a sales management/acceptance processing server 101, a discount server 102, and shop servers 103A to 103N as tenants in the electronic shopping mall. Here, in the electronic shopping mall 100, a combination of the sales management/acceptance processing server 101 and discount server 102 corresponds to an example of the shopping mall server of the present invention, and also, each of the shop servers 103A to 103N corresponds to an example of the shop server of the present invention. The shop servers 103A to 103N may be provided on a hardware unit independent of the sales management/acceptance processing server 101 or the discount server 102, or may be provided on a hardware unit where the discount server 102 is provided. However, as described later, the shop servers 103A to 103N are respectively independent with respect to their roles, particularly with respect to their discount authority.

The sales management/acceptance processing server 101 carries out the sales management and accepts accesses from customers for the entire electronic shopping mall 100. The discount server 102 estimates a discount under the responsibility of the electronic shopping mall 100 itself in response to a discount negotiation requested by the customer. The respective shop servers 103A to 103N manage the products or the services handled by the shops they belong to, and also estimate discounts under their own responsibility in response to requests provided by the sales management/acceptance processing server 101 or the discount server 102.

Figure 2:
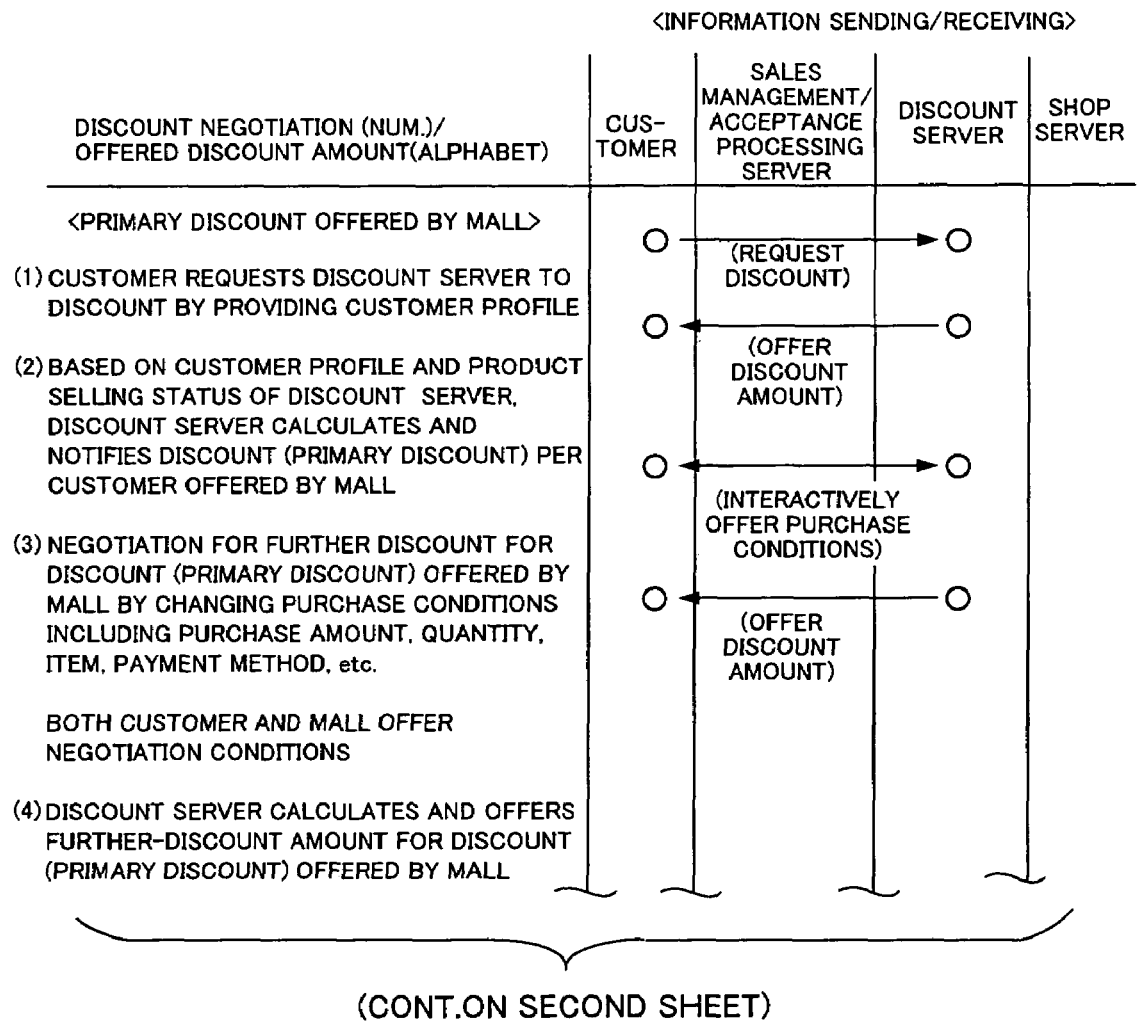
FIG. 2 is a diagram showing an outline of a discount negotiation procedure when shopping is carried out using the electronic shopping mall shown in FIG. 1.
Figure 2:
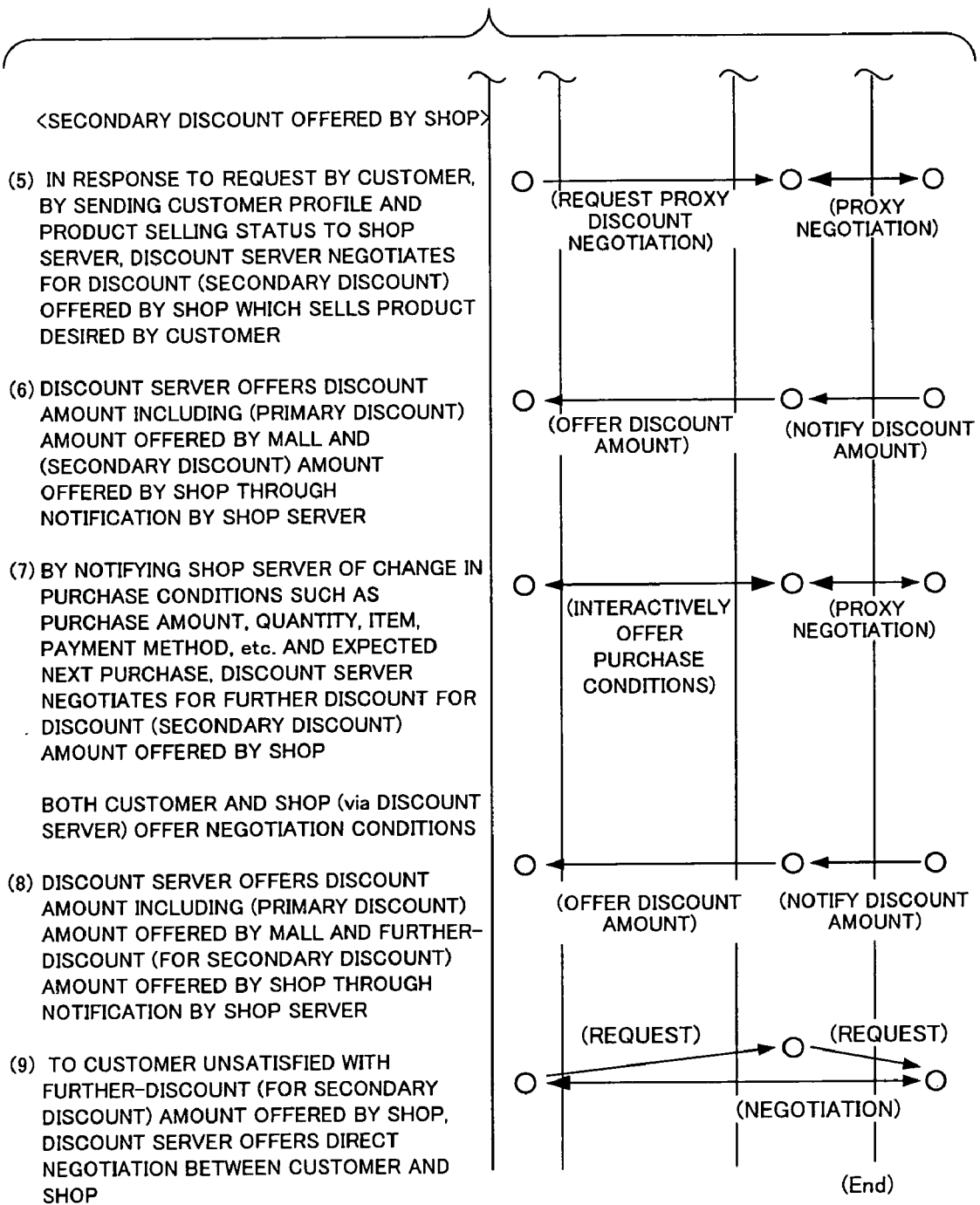

FIG. 2 is a diagram showing an outline of a discount negotiation procedure when shopping is carried out using the electronic shopping mall shown in FIG. 1.

With respect to discounts available in the shopping in the electronic shopping mall, there are a primary discount borne by the electronic shopping mall itself and a secondary discount borne by the shop as the tenant of the electronic shopping mall. Part of the tenant fees and sales expanding contributions paid by the shops to the electronic shopping mall is used as the source for the primary discount.

First of all, the primary discount is offered by the electronic shopping mall as follows.

(1) First, a customer provides his/her profile (personal information of that customer) to the electronic shopping mall, and in return requests the discount server to discount.

(2) Next, based on the profile provided by the customer, and sales status of the products handled by the discount server, etc., the discount server calculates a discount (primary discount) amount for each customer to be offered by the mall and notifies the customer of the result.

(3) When purchase conditions such as purchase price, quantity, item, payment method, etc. are changed, a further discount negotiation on the discount (primary discount) amount offered by the mall is possible. Here, negotiation conditions may be presented by both the customer and mall.

(4) If the further discount negotiation is carried out, the discount server calculates and offers a further-discount amount to be added to the discount (primary discount) amount provided by the mall.

If the customer is not satisfied with the primary discount, the secondary discount is offered in response to a request made by the customer as follows.

(5) When a negotiation for the secondary discount is requested by the customer, the discount server transmits the customer profile and sales status of the product etc. to the shop server, and carries out the negotiation for the discount (secondary discount) for the shop which handles the product the customer wants to purchase.

(6) The discount server offers the customer the total discount amount including the primary discount amount offered by the mall and the discount (secondary discount) amount offered by the shop by way of notification provided by the shop server.

(7) When a further discount is requested by the customer, the discount server notifies the change of purchase conditions such as purchase price, quantity, item, payment method, etc., or an expected next purchase etc., to the shop server, and carries out a negotiation on the further discount (for secondary discount) for the shop. Here, negotiation conditions may be presented by both the customer and shop (via the discount server).

(8) The discount server offers the total discount amount including the primary discount amount offered by the mall and the further-discount (for secondary discount) amount notified by the shop server and offered by the shop.

(9) Furthermore, if the customer is still not satisfied with the further-discount (for secondary discount) amount offered by the shop, the discount server offers the customer a direct negotiation between the customer and the shop.

Figure 3:
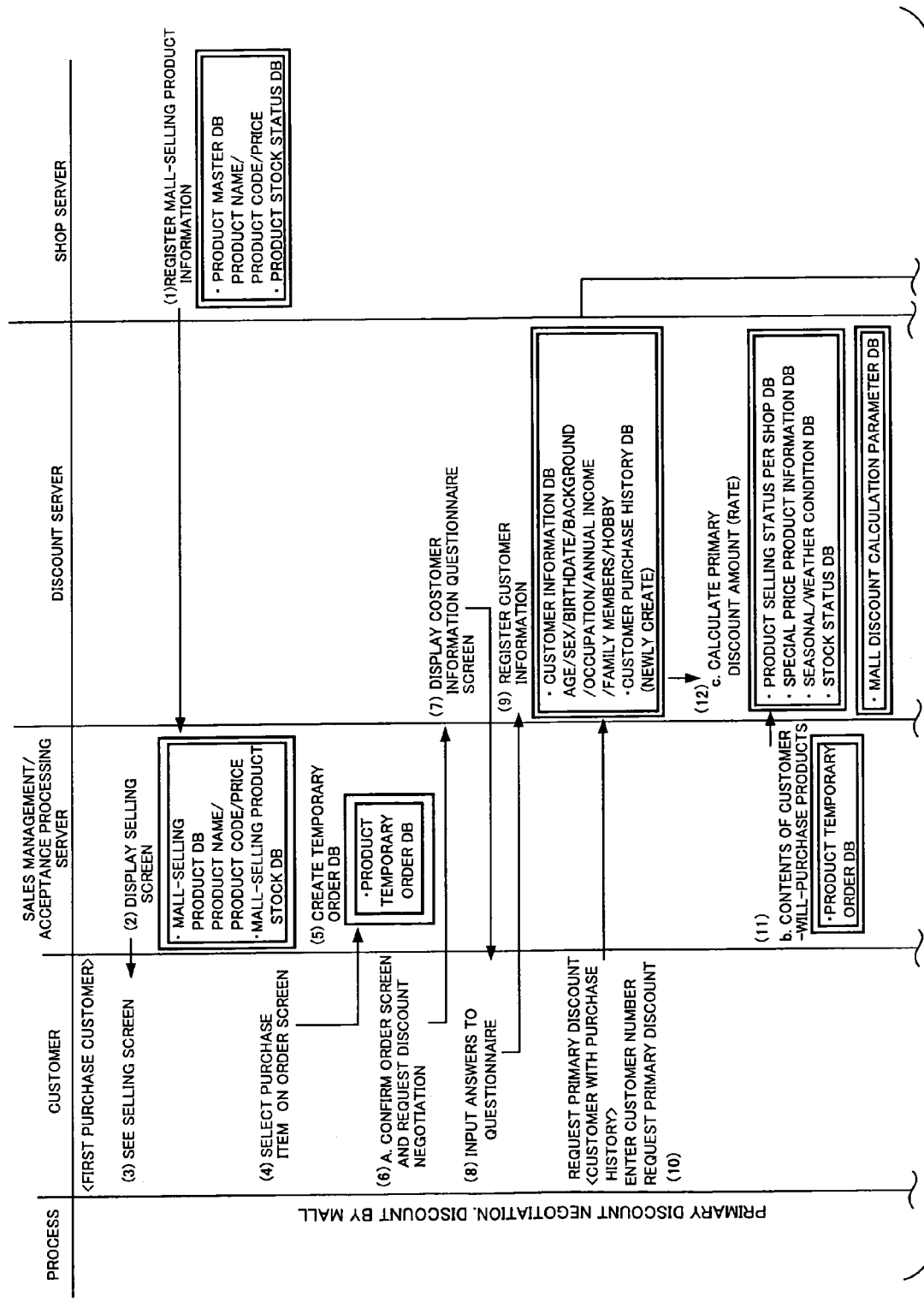
FIG. 3 is a diagram showing various tables composing a discount calculation parameter database on which a discount calculation is based.

FIG. 3 is a diagram showing various tables composing a discount calculation parameter database (DB) on which a discount calculation is based.

This figure shows the following tables.

(1) Table showing the relation between the discount rate and total purchase amount
(2) Table showing the relation between the discount rate and number of purchase items
(3) Table showing the relation between the discount rate and purchase history
(4) Table showing the relation between the discount rate and customer attribute
(5) Table showing the relation between the discount rate and product sales status
(6) Table showing the relation between the discount rate and bargain products
(7) Table showing the relation between the discount rate and seasonal/weather conditions
(8) Table showing the relation between the discount rate and stock
(9) Table showing the relation between the discount rate and payment condition
(10) Table showing the relation between the discount rate and birthday/prize factors
(11) Table showing the relation between the discount rate and an expected next purchase These tables are created for each shop associated with the entire electronic shopping mall, and registered in the database (DB). These are shown as examples, and therefore there may be adopted/unadopted tables or additional tables depending on the shop, and also discount rates etc. for the shops may be different. In addition, the maximum total discount amount (rate) may be provided.

Figure 4:
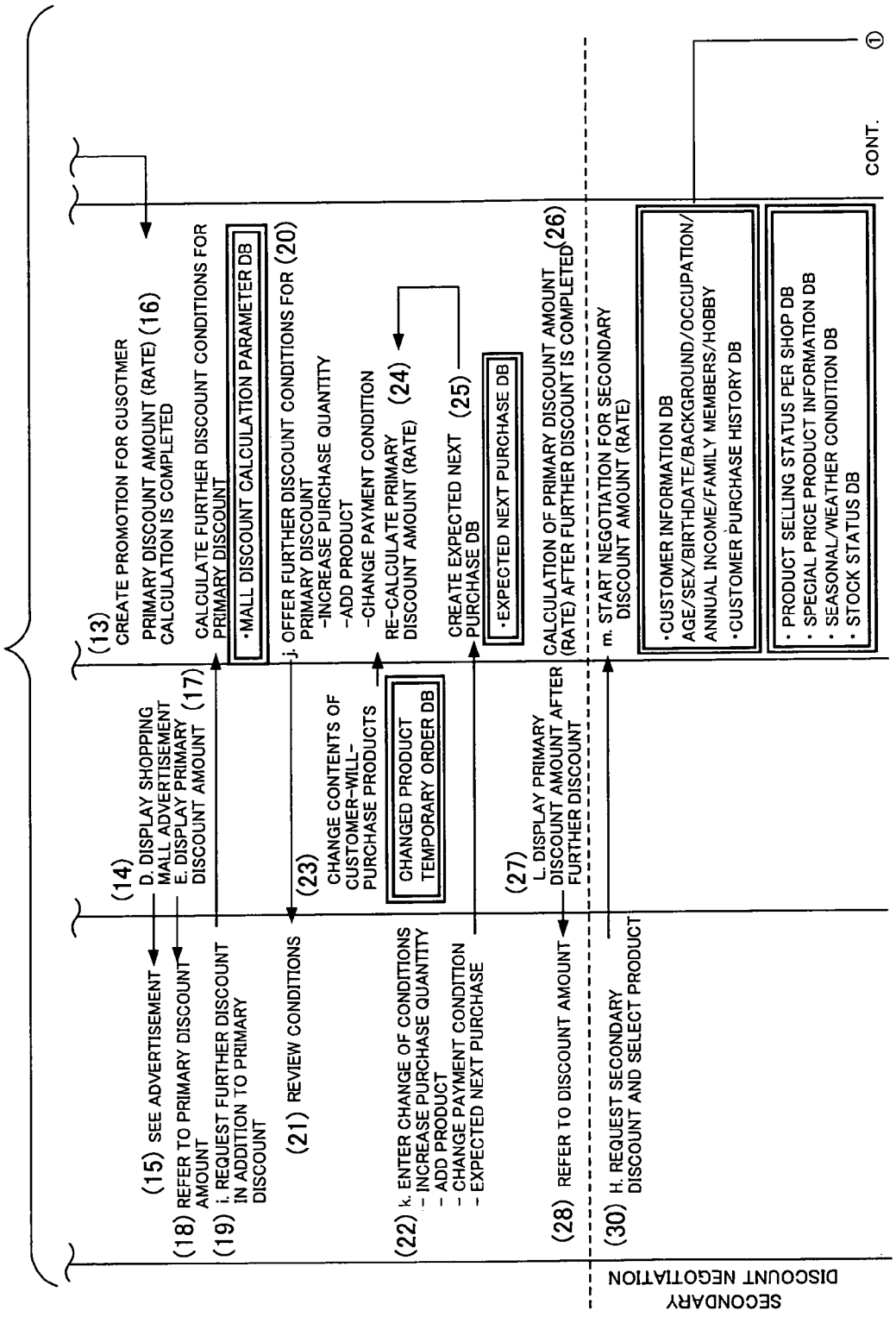
FIG. 4 is a diagram showing the first half of a detail of the discount negotiation procedure when shopping is carried out using the electronic shopping mall shown in FIG. 1.
Figure 5:
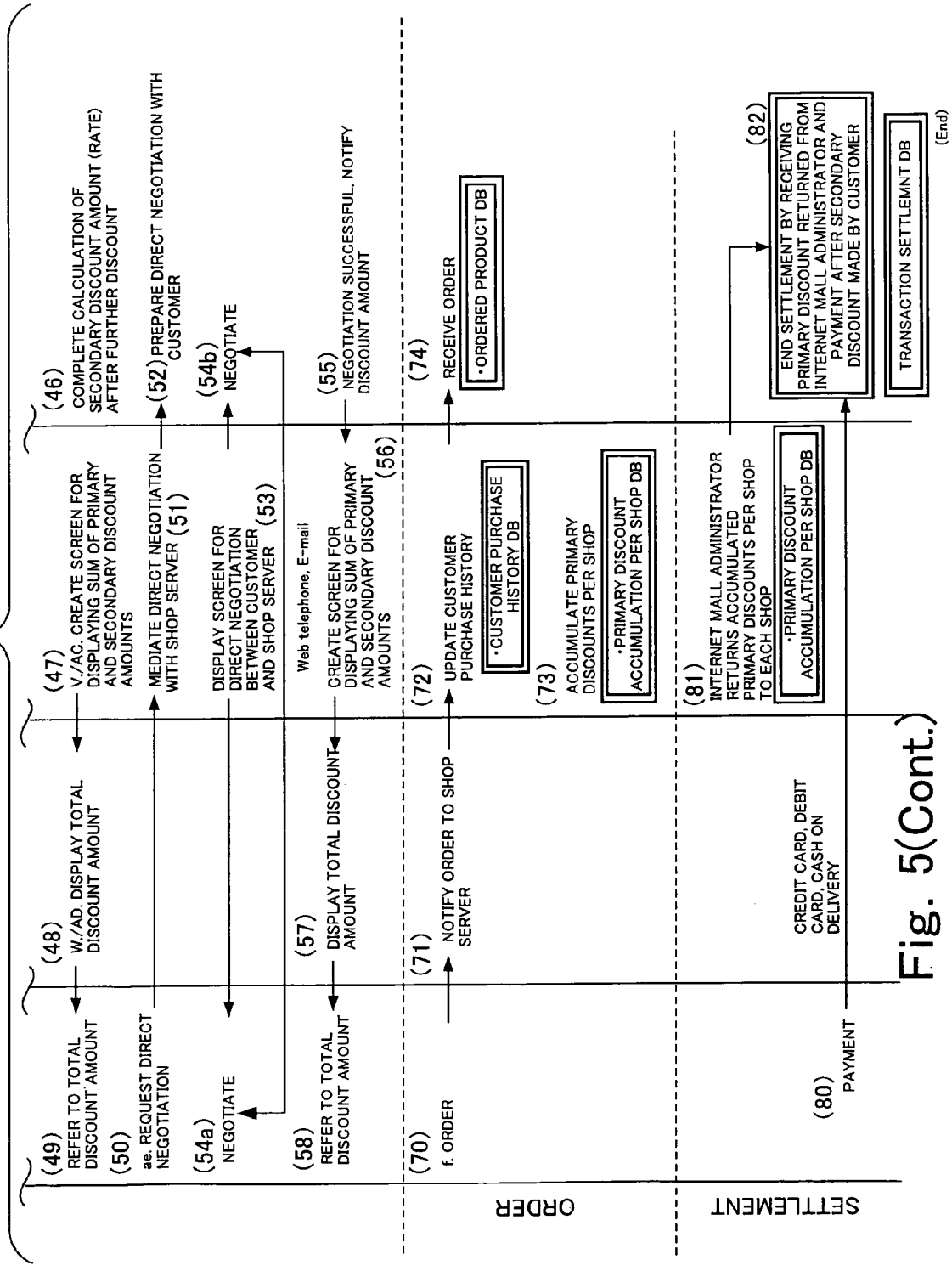
FIG. 5 is a diagram showing the second half of the detail of the discount negotiation procedure when shopping is carried out using the electronic shopping mall shown in FIG. 1.

FIGS. 4 and 5 are diagrams each showing a detail of the discount negotiation procedure when shopping is carried out using the electronic shopping mall shown in FIG. 1.

Figure 6:
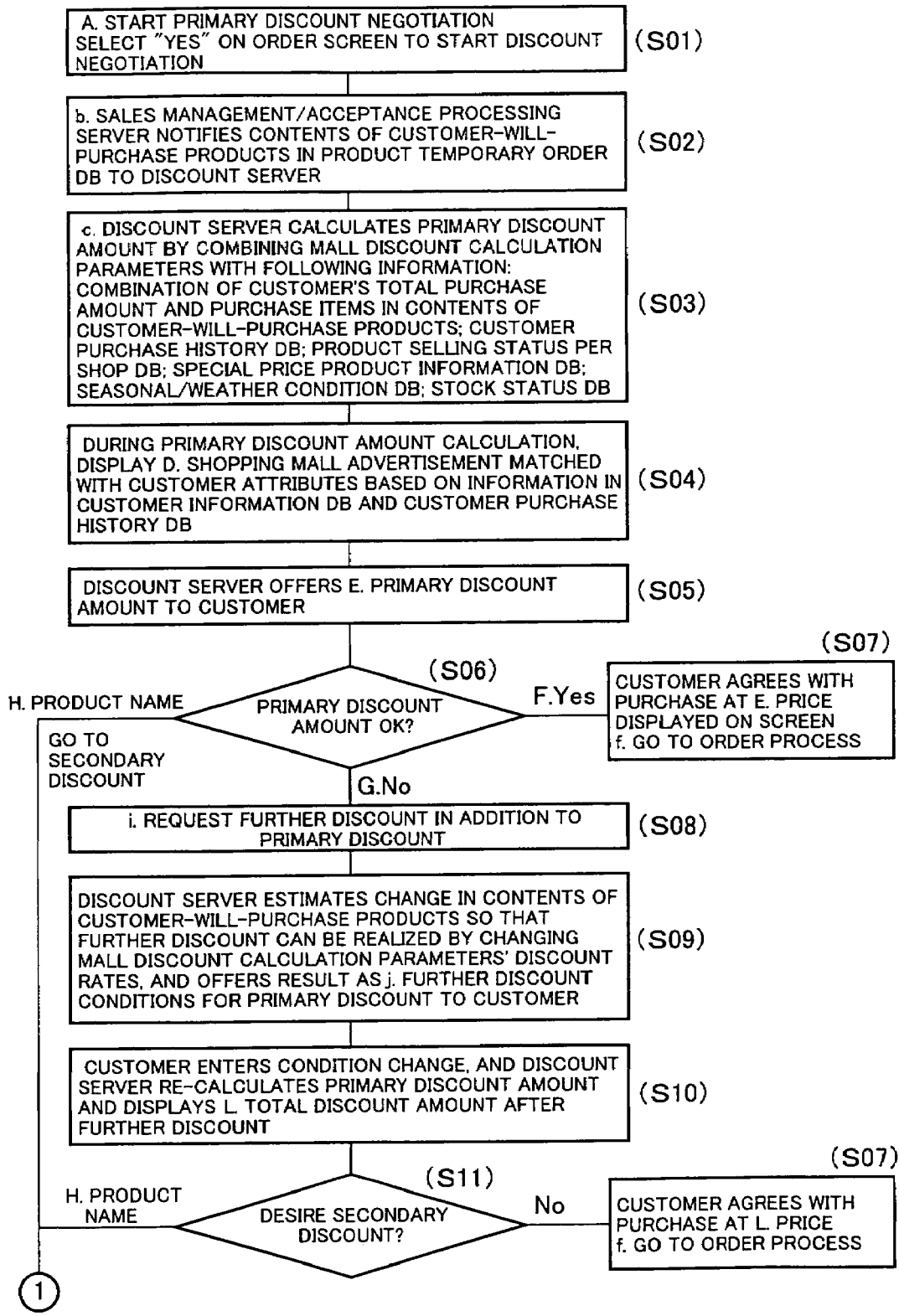
FIG. 6 is a diagram showing a primary discount negotiation of a discount negotiation flow when shopping is carried out using the electronic shopping mall shown in FIG. 1.
Figure 7:
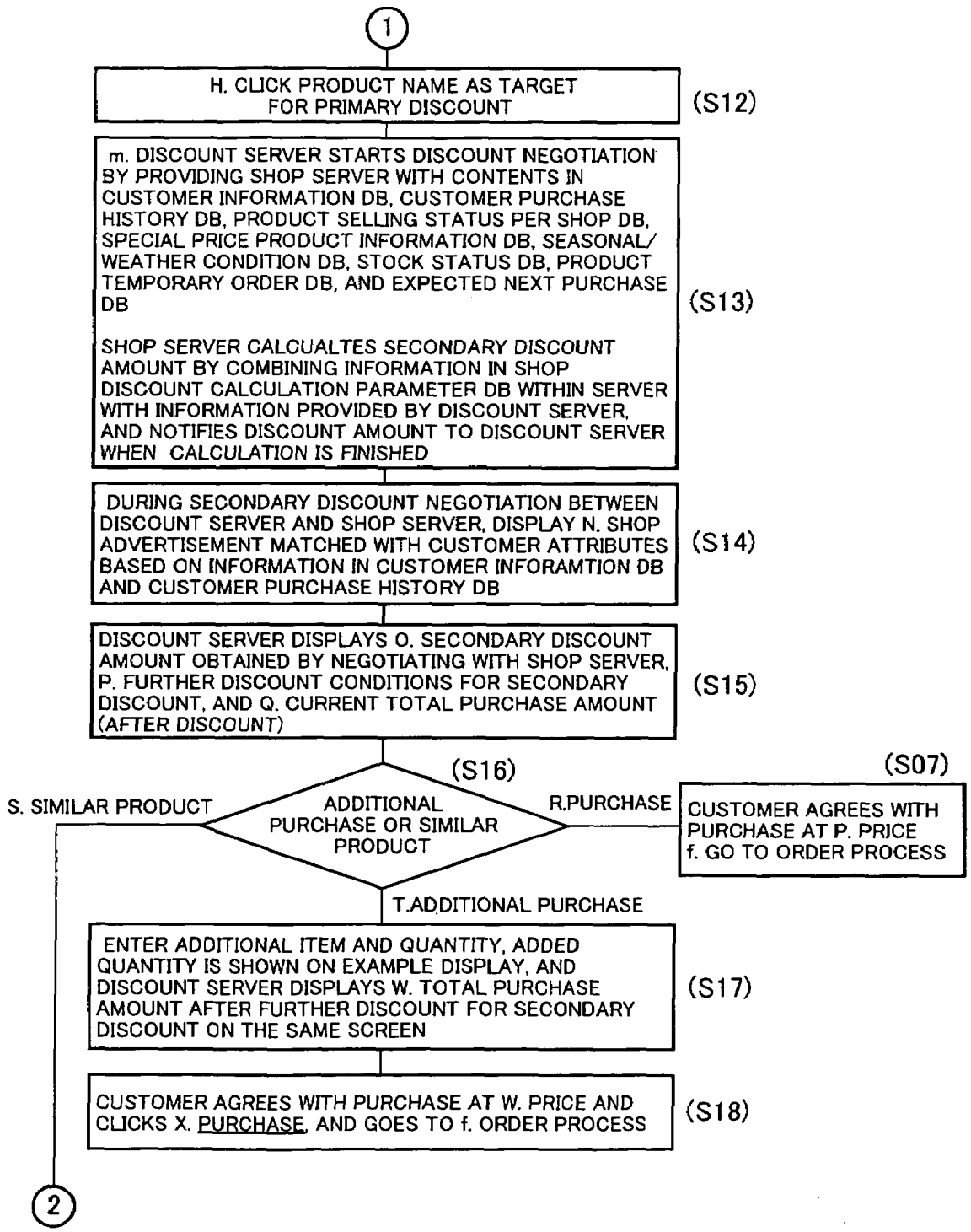
FIG. 7 is a diagram showing the first half of a secondary discount negotiation of the discount negotiation flow when shopping is carried out using the electronic shopping mall shown in FIG. 1.
Figure 8:
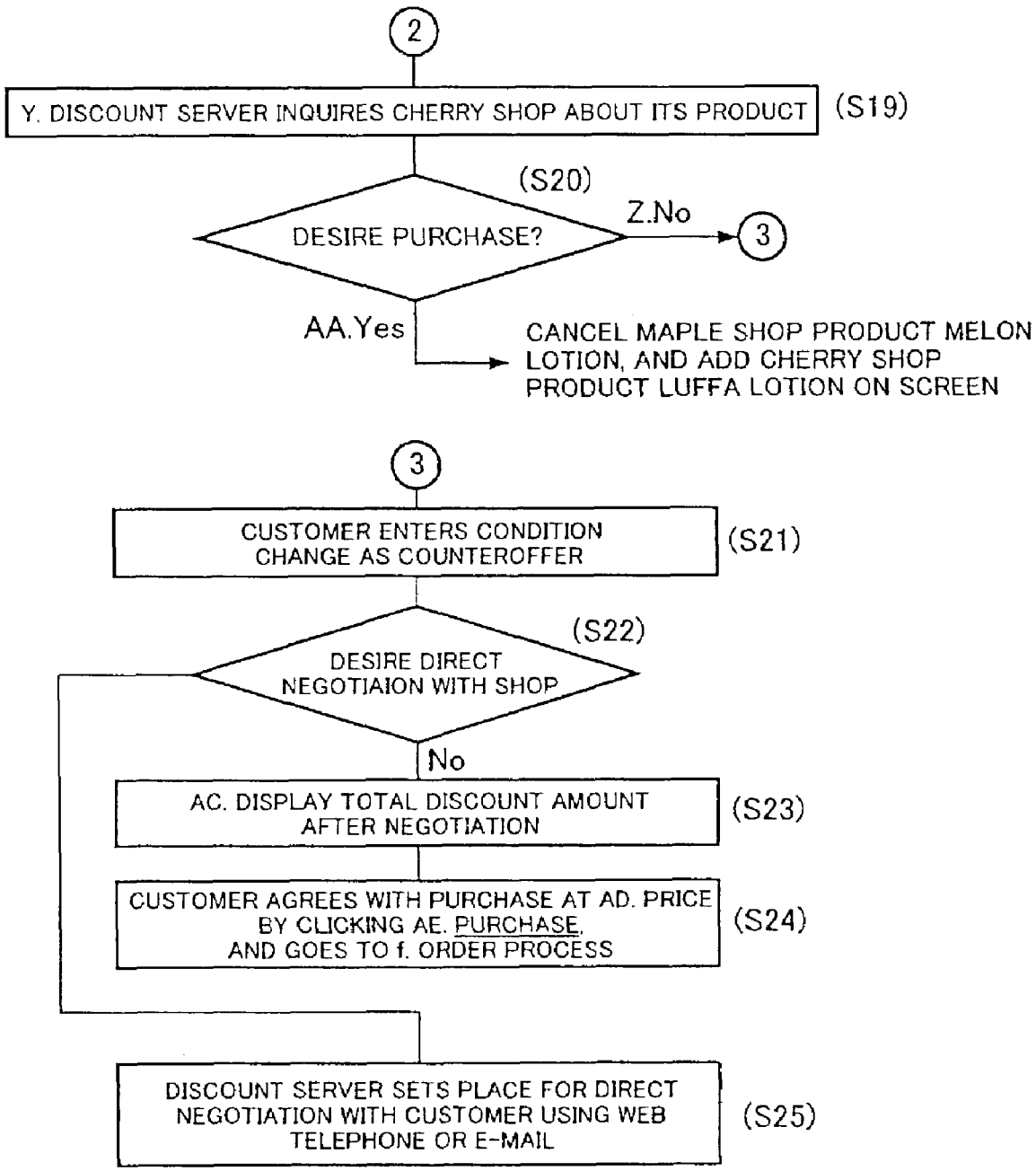
FIG. 8 is a diagram showing the second half of the secondary discount negotiation of the discount negotiation flow when shopping is carried out using the electronic shopping mall shown in FIG. 1.

FIGS. 6 to 8 are diagrams each showing a discount negotiation flow when shopping is carried out using the electronic shopping mall shown in FIG. 1, and FIGS. 9 to 18 are diagrams showing examples of various screens when shopping is carried out in the electronic shopping mall.

First, the shop server registers product information of the shop, and then, the sales management/acceptance processing server is notified of the product information and creates a mall-selling product database (DB) in which product names, product codes, prices, etc. are registered and a mall-selling product stock database (DB) for product stock management (step (1) in FIG. 4).

The sales management/acceptance processing server displays a selling screen to the customer in response to an access from the customer (step (2) in FIG. 4).

The customer refers to the displayed selling screen (step (3) in FIG. 4) and then selects an item to purchase on an order screen (step (4) in FIG. 4). Then, the selected item is registered in a product temporary order DB in the sales management/acceptance processing server (step (5) in FIG. 4).

The customer then confirms an order screen (refer to an example of order screen shown in FIG. 9), and if he/she chooses a discount negotiation (step (6) in FIG. 4, step (S01) in FIG. 6), the discount server displays a customer information questionnaire screen to the customer (step (7) in FIG. 4). Further, if he/she answers the questionnaire (step (8) in FIG. 4), the information of that customer is registered in a customer information DB in the discount server (step (9) in FIG. 4).

If the customer has a purchase history, he/she enters his/her already registered customer No. on the order screen (refer to FIG. 9) instead of answering the questionnaire (step (10) in FIG. 4).

When the customer requests the primary discount, the sales management/acceptance processing server notifies the discount server about the contents of the products that the customer will purchase in the product temporary order DB (step (11) in FIG. 4, step (S02) in FIG. 6). Then, the discount server calculates a primary discount amount (rate) (step (12) in FIG. 4, step (S03) in FIG. 6) by combining mall discount calculation parameters registering mall discount calculation methods with the following various information: the customer information DB registering the customer personal information; a combination of the total purchase amount and purchase items in the contents of the products that the customer will purchase; the customer purchase history DB representing the purchase history of the customer; a selling status DB registering product selling status for each shop; a special price product information DB registering bargain products; a seasonal/weather condition DB registering seasonal and weather conditions; and a stock status DB registering status of products in stock.

Also, while calculating the primary discount, the discount server creates a promotion for the customer (step (13) in FIG. 4), and the sales management/acceptance processing server displays an advertisement of its shopping mall (step (14) in FIG. 4, step (S04) in FIG. 6, and refer to an advertisement display screen shown in FIG. 10), and accordingly the customer looks at the advertisement until the discount is offered (step (15) in FIG. 4). Here, the advertisement is provided according to the customer by referring to his/her personal information.

When the calculation of the primary discount amount (rate) by the discount server is finished (step (16) in FIG. 4), the sales management/acceptance processing server displays the primary discount amount (step (17) in FIG. 4, step (S05)

in FIG. 6, and refer to FIG. 11), and the customer refers to the discount amount (step (18) in FIG. 4).

Since the discount amount is calculated every time by the discount server based on the customer information, sales status, etc., it is possible to offer a discount amount (rate) different every time for each customer.

The customer determines whether or not to purchase the product on that discount amount (step (S06) in FIG. 6), if the customer purchases the product on that discount amount, the process goes to an order process (step (70) in FIG. 5, step (S07) in FIG. 6). The order process will be described later.

When the customer requests a further discount in addition to the primary discount (step (19) in FIG. 4, step (S08) in FIG. 6), by referring to a mall discount calculation parameter DB, the discount server calculates the change of the contents of the products that the customer will purchase so that the further discount can be offered by changing the mall discount calculation parameters, and the result, that is, further discount conditions of the primary discount such as the increased number of the purchase items, added items, change of payment conditions, and the like is offered (step (20) in FIG. 4, step (S09) in FIG. 6). The customer reviews the conditions (step (21) in FIG. 4) and inputs the changed purchase conditions (step (22) in FIG. 4), the sales management/acceptance processing server changes the contents of the products that the customer will purchase (step (23) in FIG. 4), and the discount server re-calculates the primary discount amount (rate) (step (24) in FIG. 4). When the customer inputs the items expected to be purchased next (step (22) in FIG. 4), an expected next purchase DB is created (step (25) in FIG. 4), and that the expected next purchase is also taken into account when the primary discount amount (rate) is re-calculated (step (24) in FIG. 4).

When the calculation of the primary discount amount (rate) after the further discount is finished (step (26) in FIG. 4), the primary discount amount (rate) after the further discount is displayed (step (27) in FIG. 4, step (S10) in FIG. 6, and refer to FIG. 12) and referred to by the customer (step (28) in FIG. 4).

As a result of referring to the offered discount amount, if the customer agrees with the purchase on that discount amount (step (S11) in FIG. 6), the process goes to the order process (step (70) in FIG. 5, step (S07) in FIG. 6). On the contrary, if the customer is not satisfied with the primary discount, he/she selects a specific product and requests the secondary discount (step (30) in FIG. 4, step (S12) in FIG. 7). Then, the discount server sends to the shop server, as discount negotiation parameters, discount-requested items/ the number of such items together with the following information: the customer information DB; the customer purchase history DB; the product selling status DB; the special price product information DB; the seasonal/weather DB; the stock status DB; the product temporary order DB; and the expected next purchase DB, and then starts the discount negotiation (step (31) in FIG. 5, step (S13) in FIG. 7). The shop server calculates the secondary discount amount by referring to the discount calculation parameter DB of that shop (step (32) in FIG. 5). While the shop server calculates the secondary discount amount, the discount server creates a promotion (step (33) in FIG. 5), and the sales management/acceptance processing server displays an advertisement of that shop (step (34) in FIG. 5, step (S14) in FIG. 7), and the customer looks at the advertisement (step (35) in FIG. 5, and refer to FIG. 13).

Upon receiving a notification that the calculation of the secondary discount amount by the shop server is completed (step (36) in FIG. 5), the discount server creates a screen for displaying the sum of the primary and secondary discount amounts (step (37) in FIG. 5), and then the sales management/acceptance processing server displays that sum (step (38) in FIG. 5, step (S15) in FIG. 7, and refer to FIG. 14). The customer looks at the displayed price after discount and determines whether or not to agree with the purchase on that price (step (S16) in FIG. 7), and if the customer agrees with the purchase, the process proceeds to the order process (step (70) in FIG. 5, step (S07) in FIG. 7).

If the customer is not satisfied with the displayed price shown in FIG. 14, he/she requests a further discount in addition to the secondary discount by clicking "T. ADDITIONAL PURCHASE" or "S. SIMILAR PRODUCT" shown in FIG. 14 (step (40) in FIG. 5, step (S16) in FIG. 7). Then, the shop server offers further discount conditions for the secondary discount (step (41) in FIG. 5), and the customer reviews these conditions (step (42) in FIG. 5). Only, in FIG. 14, the shop server rejects the secondary discount in step (30) in FIG. 4 and offers beforehand the conditions under which the secondary discount is possible.

When the customer inputs the change of the purchase conditions on an additional purchase screen or the like now shown (step (42) in FIG. 5) (when the further discount for the secondary discount is requested (step (40) in FIG. 5, the additional purchase conditions are input at the same time in FIG. 14), the sales management/acceptance processing server changes the contents of the products that the customer will purchase, and the changed information is transmitted to the shop server (step (43) in FIG. 5), accordingly the shop server re-calculates the further-discount amount (rate) for the secondary discount. When data of expected next purchase is input by the customer, the discount server writes that expected next purchase of the customer in the expected next purchase DB, and also transmits that data to the shop server (step (45) in FIG. 5). In this case, the shop server takes the expected next purchase into account when calculating the further-discount amount (rate) in addition to the secondary discount.

When the calculation of the secondary discount amount (rate) by the shop server is completed (step (46) in FIG. 5), the discount server creates a screen for displaying the sum of the primary and secondary discount amounts (step 47 in FIG. 5), the sales management/acceptance processing server displays that sum to the customer (step 48 in FIG. 5). The customer refers to and reviews the displayed discount amount (step 49 in FIG. 5).

FIG. 15 is a diagram showing an example of the screen for displaying the total discount amount after the above-described negotiation.

This figure displays that one "PEACH CREAM" has been added and the total purchase amount ¥8,000 after the discount.

FIG. 16 is a diagram showing a screen for selling a similar product.

When "S. SIMILAR PRODUCT" on the screen shown in FIG. 14 is clicked in step (S16) in FIG. 7, the process proceeds to step (S19) in FIG. 8, and the discount server inquires Cherry shop about "LUFFA LOTION" that is a product similar to "MELON LOTION", and the screen for selling similar product as shown in FIG. 16 is displayed. It is also possible to carry out the input of the purchase conditions in step (42) in FIG. 5 on this screen.

If the customer desires to purchase the similar product ("LUFFA LOTION" in this case) on the screen shown in FIG. 16, "MELON LOTION" is cancelled and "LUFFA LOTION" is added to the purchase product list screen.

If the customer still does agree with the purchase and answers "NO" in step (S20) in FIG. 8 (FIG. 16), the process proceeds to step (S21) in FIG. 8 and a counteroffer for the change of the conditions is input by the customer.

FIG. 17 is a diagram showing an example of a screen for displaying the counter offer made by the customer. FIG. 18 is a diagram showing an example of a screen for displaying the total discount amount changed due to the counteroffer.

In steps (42) to (49) in FIG. 15, the above-described various negotiations are carried out, and if the customer agrees with the purchase on the total purchase amount of 8,600 yen as shown in FIG. 18 for example, he/she clicks "PURCHASE" (step (S24) in FIG. 8) and the process proceeds to the order process.

Also, if the customer desires to directly negotiate with the shop (step (50) in FIG. 5, step (S22) in FIG. 8), the discount server mediates a direct negotiation with the shop server (step (51) in FIG. 5), and the shop server prepares for the direct negotiation such as arranging a shop clerk for the direct negotiation (step (52) in FIG. 5). Once the preparation is completed, the discount server displays a direct negotiation screen to both the customer and shop (step (53) in FIG. 5). The customer and shop carry out the direct negotiation using Internet telephone (web telephone), electronic mail (E-mail), etc., through the direct negotiation screen (steps (54a) and (54b) in FIG. 5).

If the negotiation is successful, the shop server notifies the discount server of the discount amount (step (55) in FIG. 5), the discount server creates a screen for presenting the sum of the primary and secondary discount amounts (step (56) in FIG. 5), and the sales management/acceptance processing server displays that sum (step (57) in FIG. 5) so that the customer refers to the discount amount (step (58) in FIG. 5) and orders the product (step (70) in FIG. 5). Note that orders can also be made at each stage as described above when the customer agrees with the purchase on the price offered on each stage.

When the order is placed, the sales management/acceptance processing server sends an order notification to the shop server via the discount server (step (71) in FIG. 5). The discount server updates the purchase history of the customer (step (72) in FIG. 5) and accumulates the primary discount amounts offered under the responsibility of the mall for each shop (step (73) in FIG. 5). Also, the shop server receives the order through the order notification (step (74) in FIG. 5).

In a settlement, the customer pays using methods such as credit card, debit card, cash on delivery (step (80) in FIG. 5), and an administrator running the Internet mall returns, to the shops monthly for example, the accumulated primary discount amounts for each shop aggregated by the discount server (step (81) in FIG. 5). The amount to be returned is spent from tenant fees, advertisement fees, sales expanding contributions, royalties depending on sales obtained by the shops, etc. Therefore, the primary discount borne by the mall is characterized as sales promotion costs or advertisement costs of the Internet mall. The shop server completes the settlement by receiving both the primary discount amount returned from the Internet mall corporation and the payment after the secondary discount made by the customer (step (82) in FIG. 5).

As described above, in the present embodiments, a negotiation generally performed in face-to-face selling starts when the customer requests a discount by pressing a discount button on a web screen, and the customer has opportunities to obtain both the "primary discount" provided by the discount server in view of the entire mall operation management and the "secondary discount" realized through the negotiation between the discount server and shop server or through the direct negotiation by the customer with the shop server via the discount server. In this structure, the customer does not know the final price until the negotiation ends and is asked whether or not to purchase the product during the negotiation. This is effective in reducing the time spent for the above-mentioned so-called netsurfing to search for a selling site that offers the lowest price and favorable conditions.

Further, in the present embodiments, it is possible to easily manage profit and loss of the entire mall and shops since both the discount server and shop server manage the discounts. In addition, sales promotion effects are obtained in every stage, which has a large effect on proving the profit to the entire Internet mall.

Also, since the customer carries out the discount negotiations similar to those in face-to-face selling instead of netsurfing merely to search for a site offering the lower price, he/she can do the shopping while having fun equal to or more than the face-to-face shopping. That is, the customer can enjoy shopping like playing a game so to speak. Furthermore, the discounts are offered in two stages: one is for the discounts automatically carried out by the discount server, the other is for the discounts obtained by the direct negotiations by the customer, which are offered as choices to two types of customers: those who like negotiations and those who dislike negotiations. This also increases enjoyment in shopping at the Internet shopping mall of the present invention.

What is claimed is:

1. An electronic shopping mall that includes one or more virtual shops and is provided on a communication network to offer and sell products or services to a customer in response to an access provided by the customer via the communication network, comprising:

a shopping mall server that manages the electronic shopping mall and a shop server that manages the one or more of the virtual shops in the electronic shopping mall; and wherein the shopping mall server comprises:

primary offering means for, in response to a request provided by the customer, offering a product or a service that the customer desires to purchase after being selected by the customer from the products or the services handled by the one or more of the virtual shops in the electronic shopping mall together with a price of the product or the service that the customer desires to purchase;

primary-discount means for, in response to an initial discount request provided by the customer, providing a reply on a discount to be borne by the electronic shopping mall to the customer; and secondary-discount negotiation means for, in response to a further discount over the discount to be borne by the electronic shopping mall requested by the customer, carrying out a negotiation with the shop server for a discount to be borne by the one or more of the virtual shops managed by the shop server, and providing a result of the negotiation to the customer, wherein the shop server comprises secondary-discount means for, in response to a discount request provided by the shopping mall server, providing a reply on the discount to be borne by the one or more of the virtual shops managed by the shop server to the shopping mall server.

2. An electronic shopping mall according to claim 1, wherein the shopping mall server further comprises customer information database configuration means for providing the customer with a questionnaire about personal information of the customer and configuring a customer information database by registering the personal information of the customer based on a result of the questionnaire, and
wherein the primary-discount means creates an answer on the discount to be borne by the electronic shopping mall at least referring to the customer information database, to the discount request provided by the customer.

3. An electronic shopping mall according to claim 1, wherein the shopping mall server further comprises primary advertisement means for, while the shopping mall server is creating the reply on the discount to be borne by the electronic shopping mall in response to the initial discount request provided by the customer, providing an advertisement of the electronic shopping mall managed by the shopping mall server to the customer.

4. An electronic shopping mall according to claim 1, wherein the shopping mall server further comprises secondary advertisement means for, while the shopping mall server is negotiating with the shop server for the further discount to be borne by the one or more of the virtual shops, providing an advertisement of the one or more of the virtual shops managed by the shop server to the customer.

5. An electronic shopping mall according to claim 1, wherein the shopping mall server further comprises direct negotiation offering means for mediating a direct negotiation between the customer and the shop sever.

\* \* \* \* \*